3,246,009
TRIFLUOROMETHYLPHTHALIMIDES
Bernard Loev, Broomall, Pa., assignor to Smith Kline & French Laboratories, Philadelphia, Pa., a corporation of Pennsylvania
No Drawing. Filed Aug. 27, 1963, Ser. No. 304,951
3 Claims. (Cl. 260—326)

This invention relates to new trifluoromethylphthalimides and to intermediates for preparing them. The trifluoromethylphthalimides of this invention have pharmacodynamic activity such as analgesic and central nervous system stimulant activity and, in particular, have distinctive anti-pyretic activity.

The trifluoromethylphthalimides of this invention are represented by the following structural formula:

FORMULA I

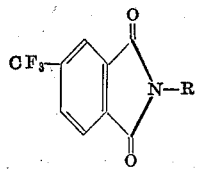

when:

R represents hydrogen or lower alkyl having 1 to 6 carbon atoms.

A preferred compound of this invention is 4-trifluoromethylphthalimide.

The new trifluoromethylphthalic acid amide intermediates, also objects of this invention, are represented by the following structural formula:

FORMULA II

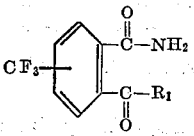

when:

$R_1$ represents amino, hydroxy or lower alkoxy and $CF_3$ is in a position $\beta$ to a carbonyl group.

The trifluoromethylphthalimides are prepared by the following procedures:

Procedure I

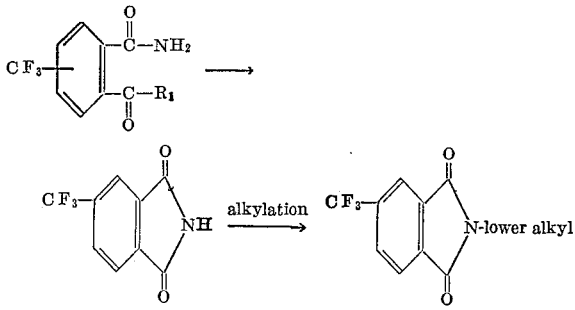

Procedure II

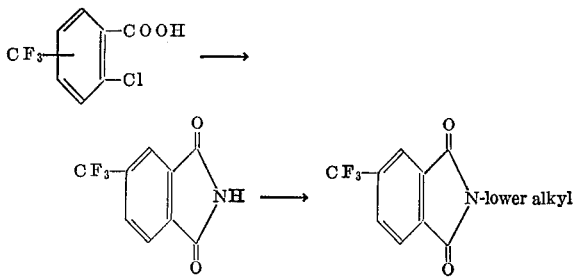

According to procedure I, 4(or 5)-trifluoromethylphthalamic acid or ester or 4-trifluoromethylphthalic acid diamide is heated conveniently in an inert solvent such as diphenyl ether or chlorobenzene at about 150–250° C. to give 4-trifluoromethylphthalimide.

The 4- or 5-trifluoromethylphthalamic acid intermediates are prepared by treating 4-trifluoromethylphthalic acid with acetic anhydride followed by ammonia. Esterifying 4-trifluoromethylphthalic acid and treating the resulting ester with ammonia at about 50° C. in a lower alkanol solvent gives the trifluoromethylphthalamic acid ester intermediate which on treatment with additional ammonia in a lower alkanol solvent at elevated temperature, such as at the reflux temperature of the reaction mixture, gives the trifluoromethylphthalic acid diamide intermediate.

According to procedure II, 2-chloro-4(or 5)-trifluoromethylbenzoic acid is reacted with cuprous cyanide in a suitable solvent such as dimethylformamide. The reaction is preferably carried out at elevated temperatures such as at about 60–150° C. Adding water to the cooled reaction mixture and filtering gives 4 - trifluoromethylphthalimide.

The 2-chloro-4(or 5)-trifluoromethylbenzoic acid is prepared by diazotizing the appropriate amino-chlorobenzotrifluoride, treating with potassium iodide and reacting the resulting iodo-chlorobenzotrifluoride with magnesium in ether followed by carbon dioxide.

The N-lower alkyl compounds of this invention are prepared by alkylating 4-trifluoromethylphthalimide with an alkylating agent such as a lower alkyl halide or a di-lower alkyl sulfate preferably in the presence of a base, such as potassium carbonate or sodium carbonate, in a solvent, for example dimethylformamide, at elevated temperature, such as at about 50–150° C.

The following examples are not limiting but are illustrative of the compounds of this invention and procedures for preparing them.

EXAMPLE 1

To a hot solution of 2 l. of concentrated sulfuric acid in 4 l. of water is added 616.5 g. of 3-amino-4-chlorobenzotrifluoride. The mixture is slowly cooled to 0–5° C. with vigorous stirring. A solution of 207 g. of sodium nitrite in 840 ml. of water is added followed by 549 g. of potassium iodide in 815 ml. of water. The resulting mixture is heated to 50° C. for one hour, then cooled and extracted with ether. The ether extracts are washed with an aqueous solution of sodium thiosulfate then with water. The extracts are dried, filtered, concentrated and distilled to give 3-iodo-4-chlorobenzotrifluoride, B.P. 58–60° C. (0.5 mm.).

A refluxing solution of 150 g. of magnesium in 2 l. of ether is treated with a few drops of ethylene bromide and the 3-iodo-4-chlorobenzotrifluoride, prepared above, dissolved in 9.4 l. of ether is added over a period of two hours. The mixture is refluxed and stirred for two hours, adding 1 ml. of ethylene bromide after each hour. The mixture is cooled to −20° C. in a Dry Ice-acetone bath and 800 g. of dry carbon dioxide is bubbled into the mixture over a period of 90 minutes. After standing overnight, 3 l. of cold 10% hydrochloroic acid is added to 0° C. The mixture is extracted with ether and the ethereal solution is extracted with 10% potassium carbonate solution. The aqueous solution is treated with charcoal, filtered, acidified with concentrated hydrochloric acid and filtered to give 2-chloro-5-trifluoromethylbenzoic acid which on recrystallization from benzene-petroleum ether melts at 91–92° C.

A mixture of 50 g. of 2-chloro-5-trifluoromethylbenzoic acid, 30 g. of cuprous cyanide and 80 ml. of dimethylformamide is heated at reflux with stirring for 45 minutes.

The mixture is cooled slightly and a solution of 25 ml. of concentrated hydrochloric acid in 125 ml. of water is added over five minutes. After heating at 65° C., for 15 minutes, cooling, adding 50 ml. of ice water, filtering, triturating the solid material with 5% sodium bicarbonate solution and filtering, there is obtained 4-trifluoromethylphthalimide which on recrystallization from benzene melts at 168.5–169.5° C.

EXAMPLE 2

Ten grams of 4-trifluoromethylphthalic acid is heated at reflux in 50 ml. of acetic anhydride. Concentrating and distilling gives trifluoromethylphthalic anhydride which is treated with a 5% excess of ammonia in ethanol at 20° C. to give, after concentrating and recrystallizing, 4-trifluoromethylphthalamic acid and also the 5-isomer.

Heating 4.0 g. of the above prepared trifluoromethylphthalamic acid in 50 ml. of diphenyl ether at about 200° C., then cooling, concentrating and filtering gives 4-trifluoromethylphthalimide.

EXAMPLE 3

A mixture of 5.0 g. of 4-trifluoromethylphthalic acid and 25 ml. of ethanol containing 0.5 ml. of hydrochloric acid is heated at reflux for two hours to give, after concentrating and distilling, diethyl 4-trifluoromethylphthalate.

The above prepared ester is treated with ammonia in ethanol at 50° C. to give the ethyl ester of 4(and 5)-trifluoromethylphthalamic acid which on treatment with additional ethanolic ammonia at reflux gives, after cooling and concentrating, 4-trifluoromethylphthalic acid diamide.

Heating 4-trifluoromethylphthalic acid diamide in diphenyl ether at 200° C., cooling, concentrating and filtering gives 4-trifluoromethylphthalimide.

Similarly heating the ethyl ester of 4(or 5)-trifluoromethylphthalamic acid, prepared as described above, in diphenyl ether gives 4-trifluoromethylphthalimide.

EXAMPLE 4

To 10.0 g. of 4-trifluoromethylphthalimide and 6.4 g. of potassium carbonate suspended in 75 ml. of dimethylformamide is added 4.2 ml. of dimethylsulfate. The resulting mixture is heated at reflux for 10 hours, then filtered and concentrated. The residue is sublimed in vacuo to give N-methyl-4-trifluoromethylphthalimide, M.P. 107–109° C.

EXAMPLE 5

A mixture of 4.3 g. of 4-trifluoromethylphthalimide, 3.0 g. of butyl bromide and 3.0 g. of potassium carbonate in dimethylformamide is heated at reflux for eight hours, then filtered and concentrated. The residue is recrystallized from aqueous methanol to give N-butyl-4-trifluoromethylphthalimide.

Similarly using hexyl bromide or ethyl iodide in place of butyl bromide in the above described procedure the products are N-hexyl-4-trifluoromethylphthalimide and N-ethyl-4-trifluoromethylphthalimide, respectively.

What is claimed is:
1. A compound of the formula:

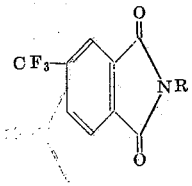

in which:
R is a member selected from the group consisting of hydrogen and lower alkyl.
2. 4-trifluoromethylphthalimide.
3. N-methyl-4-trifluoromethylphthalimide.

References Cited by the Examiner

UNITED STATES PATENTS

| | | | |
|---|---|---|---|
| 2,904,553 | 9/1959 | Sasse et al. | 260—326 |
| 2,960,509 | 11/1960 | Stephens | 260—326 |
| 3,046,301 | 7/1962 | Phillips et al. | 260—471 |
| 3,048,620 | 8/1962 | Spivack | 260—471 |

OTHER REFERENCES

Peron et al., "Jour. Med. and Pharm. Chem., volume 5, 1962, pages 1016–1025.

NICHOLAS S. RIZZO, *Primary Examiner.*